United States Patent
Agapiou et al.

(10) Patent No.: US 12,522,762 B2
(45) Date of Patent: Jan. 13, 2026

(54) MIXTURE FOR PRE-CEMENTING OPERATION IN WELLBORE

(71) Applicant: Halliburton Energy Services, Inc., Houston, TX (US)

(72) Inventors: Kyriacos Agapiou, Houston, TX (US); Thomas Jason Pisklak, Cypress, TX (US); James Robert Benkley, Duncan, OK (US); Claudia Pineda, Humble, TX (US); Paul J. Jones, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/543,002

(22) Filed: Dec. 18, 2023

(65) Prior Publication Data
US 2024/0117236 A1  Apr. 11, 2024

Related U.S. Application Data

(62) Division of application No. 17/509,747, filed on Oct. 25, 2021, now Pat. No. 11,884,873.

(51) Int. Cl.
*C09K 8/504* (2006.01)
*C09K 8/40* (2006.01)
*C09K 8/50* (2006.01)

(52) U.S. Cl.
CPC .............. *C09K 8/5045* (2013.01); *C09K 8/40* (2013.01); *C09K 8/501* (2013.01)

(58) Field of Classification Search
CPC .......... C09K 8/40; C09K 8/487; C09K 8/501; C09K 8/504; C09K 8/5045; C09K 2208/10
See application file for complete search history.

(56) References Cited

U.S. PATENT DOCUMENTS

| | | | | |
|---|---|---|---|---|
| 3,042,608 | A * | 7/1962 | Morris | C04B 16/04 507/112 |
| 4,156,464 | A * | 5/1979 | Hussin | E21B 43/267 166/308.6 |
| 7,284,611 | B2 * | 10/2007 | Reddy | C09K 8/516 166/295 |
| 9,120,962 | B1 * | 9/2015 | Chatterji | B01F 35/7544 |
| 10,144,860 | B1 * | 12/2018 | Reddy | E21B 33/138 |
| 2006/0162930 | A1 * | 7/2006 | Gronsveld | C09K 8/467 507/224 |

(Continued)

FOREIGN PATENT DOCUMENTS

GB 2120302 A * 11/1983 ............. C09K 8/032

OTHER PUBLICATIONS

Henneberry, All About Soda Lime Glass-Composition and Properties, Sep. 30, 2019, Thomas, retrieved Aug. 4, 23 from https://www.hartenergy.com/exclusives/overcoming-lost-circulation-while-cementing-presalt-wells-1 76738 (Year: 2019).*

*Primary Examiner* — Angela M DiTrani Leff

(74) *Attorney, Agent, or Firm* — Kilpatrick Townsend & Stockton LLP

(57) ABSTRACT

A treatment fluid for performing one or more pre-cementing operations in a wellbore can include a base fluid, a viscosifier, and a crushed glass material. The viscosifier can be dispersed in the base fluid. The crushed glass material can be dispersed in the base fluid for performing one or more cementing operations with respect to the wellbore.

18 Claims, 6 Drawing Sheets

(56) References Cited

U.S. PATENT DOCUMENTS

| | | | |
|---|---|---|---|
| 2009/0286697 A1* | 11/2009 | Shaarpour | C09K 8/502 507/104 |
| 2012/0181034 A1* | 7/2012 | Bour | C09K 8/508 166/310 |
| 2012/0318174 A1* | 12/2012 | Ravi | C04B 28/02 106/710 |

* cited by examiner

MIXTURE FOR PRE-CEMENTING OPERATION IN WELLBORE

RELATED APPLICATIONS

This is a divisional of U.S. patent application Ser. No. 17/509,747 filed Oct. 25, 2021, entitled, "MIXTURE FOR PRE-CEMENTING OPERATION IN WELLBORE," which is incorporated by reference herein.

TECHNICAL FIELD

The present disclosure relates generally to wellbore operations and, more particularly (although not necessarily exclusively), to treatment fluids for use in pre-cementing operations in wellbores.

BACKGROUND

A wellbore can be formed in a subterranean formation for extracting produced hydrocarbon or other suitable material. One or more wellbore operations can be performed with respect to the wellbore (e.g., drilling to form the wellbore, extracting produced hydrocarbon, etc.). The wellbore operations can include or otherwise involve treating or otherwise cleaning the wellbore (e.g., cleaning debris and the like from a wall of the wellbore). Wellbore operations that involve treating the wellbore may be performed in preparation of a cementing operation (e.g., to allow the cementing operation to be performed). Other mixtures may be used to treat the wellbore, but the other mixtures may not mitigate or otherwise prevent lost circulation in the wellbore. Additionally, the other mixtures may not adequately clean the wellbore for allowing a cementing operation to be performed.

DETAILED DESCRIPTION

Figure 1:
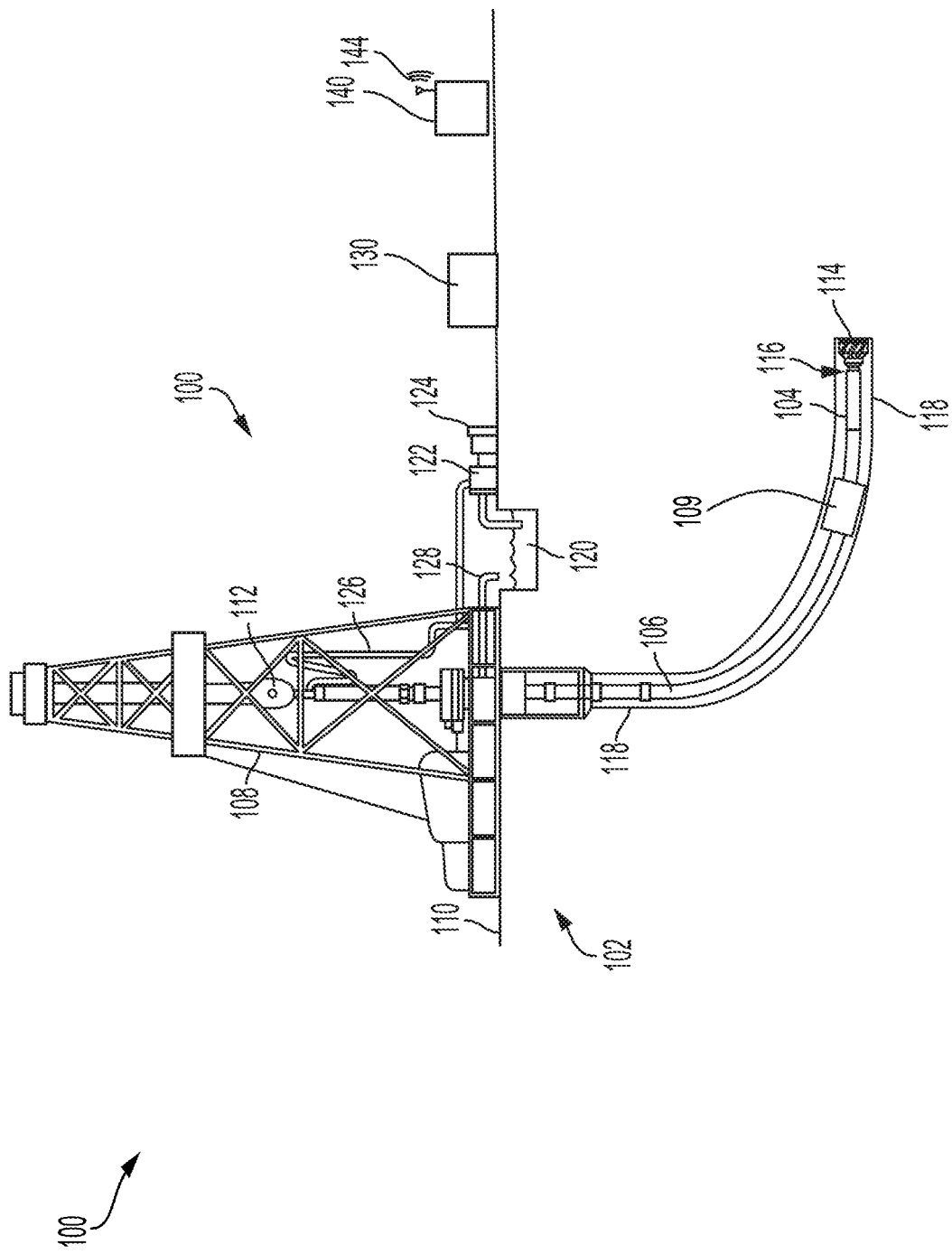
FIG. 1 is a schematic of a well system that can use a treatment fluid for a pre-cementing operation with respect to a wellbore according to one example of the present disclosure.

Certain aspects and examples of the present disclosure relate to using a treatment fluid for a pre-cementing operation in a wellbore. The pre-cementing operation can be performed before a cementing operation of the wellbore and during or subsequent to a drilling operation that can form the wellbore. The pre-cementing operation may prepare or otherwise treat the wellbore for allowing the cementing operation to be performed. For example, the pre-cementing operation can include a wellbore cleaning operation (e.g., mud or debris removal or other suitable wellbore cleaning operations), lost circulation operations (e.g., for preventing, mitigating, or eliminating lost circulation in the wellbore), and other suitable operations performed with respect to the wellbore prior to a cementing operation. The treatment fluid can be pumped downhole or otherwise positioned in the wellbore for performing the pre-cementing operation. The treatment fluid can include a base fluid (e.g., water or other suitable base fluid), a crushed glass material, which can include or be recycled glass material, dispersed in the base fluid, viscosifiers dispersed in the base fluid for adjusting a density, a viscosity, or a specific gravity of the treatment fluid. The crushed glass material may include a hardness and angularity that can abrasively clean the wellbore for allowing a cementing operation to position cement with improved adhesion (compared to an adhesion of the cement when using other treatment fluids) to the wellbore. Additionally, the crushed glass material may include particle sizes that can be used to mitigate or prevent lost circulation in the wellbore.

In some examples, lost circulation can be a challenge encountered during various wellbore operations of a well system. Lost circulation can cause or otherwise contribute to loss of fluid (produced hydrocarbon material, mud, etc.) in the wellbore. Lost circulation can additionally cause or otherwise contribute to non-productive time, which can reduce productivity and cost-efficiency of the well system. Additionally, removal of mud or mud systems from a wellbore of the well system can be difficult. Solids-free solutions may not provide adequate cleaning (e.g., through abrasion) for the wellbore and may require more volume to clean the wellbore than a solution with solids. Inadequate removal of the mud or mud systems from the wellbore can cause inadequate zonal isolation, bad bond logs, and the like. Inadequate mud removal, prior to cementing, can additional cause the wellbore to be unclean during cementing. Cementing an unclean wellbore can result in poor adhesion of cement to the wall of the wellbore. Cementing the unclean wellbore can additionally result in preventable remediation costs and additional work associated with the wellbore. The work can include correcting annular gas issues, correcting areas exposing the zone of interest, and other suitable additional work. Cleaning long lateral wellbores, where mud removal can be difficult, may likewise be difficult.

A treatment fluid, a mixture, a solution, or the like can be used to mitigate or prevent lost circulation in the wellbore and to improve mud removal and cleaning of the wellbore prior to a cementing operation performed with respect to the wellbore. The treatment fluid can include various materials including crushed glass or other scouring agents as a lost circulation material and as an abrasive wellbore cleaning material. In some examples, the crushed glass can include recycled glass obtained, for example, from post-consumer glass sources. The treatment fluid can be pumped downhole or otherwise positioned in the wellbore for mitigating lost circulation and for performing mud removal operations. For example, the treatment fluid can remove, via mechanical abrasion or other suitable cleaning mechanisms, mud or gelled mud from the wellbore. The treatment fluid can clean the wellbore prior to a cementing operation (e.g., during a pre-cementing operation) for improving a zonal isolation in the wellbore, for improving cement adhesion in the wellbore, and for other suitable improvements.

The crushed or recycled glass may generate a smaller carbon footprint and may be safer than other scouring agents. For example, the crushed glass may be recycled from post-consumer glass products. Using post-consumer materials may reduce carbon emissions associated with using the materials (e.g., fewer manufacturing processes using carbon-based energy may be used to provide the glass for use in the treatment fluid). Additionally, the crushed or recycled glass may improve safety with respect to a well system since the glass is amorphous, while the other scouring agents may be crystalline. Amorphous material may be safer than crystalline material for various reasons. For example, inhalation of crystalline material may cause respiratory issues, and, due to these potential respiratory issues, use of crystalline material may be monitored or restricted in the well system. In contrast, amorphous material may not cause similar health issues, and, accordingly, the use of amorphous material, such as the crushed or recycled glass, may not be monitored or restricted in the well system. For example, fewer recording requirements and personal protective equipment may be required in the well system using the crushed or recycled glass compared to using the other, crystalline, scouring agents.

Lost circulation can be encountered during various well operations and can contribute to non-productive time. Whether encountered during drilling the wellbore or in cementing operations, lost circulation of drilling fluids, spacers, cements, or any other treatment fluid can decrease productivity and efficiency of a well system. Lost circulation materials can be incorporated into a treatment fluid upon encountering a lost circulation zone to stop losses or pre-emptively before losses are encountered. The choice of lost circulation material can be based on a magnitude of the losses, sizes and shapes of the lost circulation material, and other suitable factors.

An optimum particle size of a lost circulation material can be a size at which, after bridging or plugging a permeable formation (associated with or otherwise in a wall of the wellbore), a minimum amount of fluid (drilling fluid, cement, spacer fluid, etc.) is lost to the formation. Several models can be used to help determine the optimal particle size of the lost circulation material, however, the models may not always be accurate or available. Additionally, a wellbore may have permeable formations with varying sizes of openings, which cannot be plugged using particles of a single particle size.

The treatment fluid disclosed herein can include combinations of differently sized scouring agent (e.g., crushed or recycled glass) particles to form a tailored lost circulation material to fit an application or, alternatively, a broad range of applications. Further, various methods for formulating a treatment fluid (e.g., cements, spacers, drilling mud, or other fluids) with the addition of a scouring agent, such as crushed or recycled glass particles, in various particle size distributions (or ratio of sizes) to optimize reduction in losses can be used.

The scouring agent (e.g., crushed or recycled glass) of the treatment fluid can be a pozzolanic material. Pozzolanic materials can react with lime or other similar materials to form a cementitious product and can be utilized to set lost circulation material compositions for reducing losses in the wellbore. In such examples, the pozzolanic scouring agent may be formulated along with an alkali activator, such as hydrated lime, cement, metal hydroxide, or other suitable alkali activator, which can be deposited in lost circulation (or thief) zones. The alkali activator can hydrate over time to form a plugging matrix, compared to other lost circulation materials or scouring agents, which may only physically plug pore throats or fractures in the wellbore.

The crushed or recycled glass in the wellbore material may be similar, identical to, or otherwise an improvement over other scouring agents usable in other treatment fluids. For example, particles of the crushed glass can include an angularity, a hardness, other suitable measurements, or a combination thereof that are higher than (or otherwise an improvement over) the other scouring agents. The improved angularity and hardness may allow the crushed or recycled glass to abrasively clean the wellbore better than the other scouring agents. Additionally, particles of the crushed or recycled glass may include varying size ranges. Some examples of size ranges include 500 microns (0.020 in) to 920 microns (0.035 in), 227 microns (0.009 in) to 400 microns (0.016 in), 205 microns (0.008 in) to 906 microns (0.034 in), 68 microns (0.003 in) to 310 microns (0.012 in), 31 microns (0.002 in) to 159 microns (0.006 in), or other suitable particle size ranges.

One or more particle size ranges of the crushed or recycled glass can be selected to perform lost circulation operations in the wellbore. For example, perforations or pores in the wellbore can cause lost circulation in the wellbore, and a size range of the perforations can be identified. Based on the identified size range of the perforations or the pores, one or more particle size ranges can be selected and included in the treatment fluid, which can be pumped downhole or otherwise positioned in the wellbore to mitigate or prevent lost circulation. Alternatively, one or more particle size ranges can be selected and included in the treatment fluid based on an amount or a location of lost circulation in the wellbore. Further, the particle size range or ranges can be tailored so that optimal penetration into the formation can be realized, for example for strengthening the wellbore or for other suitable reasons.

Scouring agents for the treatment fluid, such as recycled glass particles (e.g., soda-lime glass particles), can be used as effective materials to formulate spacer fluids. Spacer fluids can include fluids that do not spontaneously set and that may be usable to clean (e.g., via mechanical abrasion) a wellbore or other suitable system. The scouring agents can be combined with a base fluid, such as water, to form a spacer or can be combined with water and hydrated lime or other reactive materials to form an efficiency fluid that may be capable of consolidation. Consolidation of the efficiency fluid can be achieved due the unique properties of the scouring agent, such as a relatively high water absorption or water requirement, a low specific gravity, and a pozzolanic reactivity that can be combined with lime to achieve controllably delayed consolidation.

To form an effective spacer fluid various properties of the material may fit into different, defined ranges. For example, if the particle size of the scouring agent is slightly higher than desired, the scouring material can still be easily formulated into spacer fluids. A treatment fluid using the scouring material with the slightly higher than desired particle size may be adjusted to account for fluid stability. High hardness, high angularity, and small size may each contribute to efficient or effective hole cleaning. Furthermore, the scouring agent (e.g., the crushed or recycled glass material) may be relatively inexpensive, which can allow for higher volumes of spacer fluids for a similar cost to traditional fluids and can allow for higher volumes of spacer fluids flowing through the wellbore, which can result in a higher cleaning efficiency. A cleaner wellbore may lead to a more robust zonal isolation.

Incorporation of solid particulates (e.g., the scouring agent such as recycled glass) into the treatment fluid that can be pumped ahead of a cementing operation can promote mud removal by improving erosion of the gelled mud by mechanical abrasion or other suitable cleaning mechanisms. Recycled or crushed glass may be an optimal material for addition to the treatment fluid (spacers, efficiency fluids, etc.) due to hardness, angular shape, and ready availability of the recycled or crushed glass. The recycled glass can be blended with viscosifiers, such as a diutan gum concentration, to adjust for density, specific gravity, or other measure of the treatment fluid. The diutan gum may be substituted with welan gum, xanthan gum, or any other suitable biopolymer viscosifier or other type of viscosifier. The ratio of the recycled glass to the viscosifiers can range from about 97:3 to 98:2 or can include other suitable ratio range.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a well system 100 that can use a treatment fluid for a pre-cementing operation with respect to a wellbore according to one example of the present disclosure. The well system 100 can include a wellbore 118 that can be used to extract hydrocarbons from a subterranean formation 102. The wellbore 118 can be drilled using the well system 100. The well system 100 may drive a bottom hole assembly (BHA) 104 positioned or otherwise arranged at the bottom of a drill-string 106 extended into the subterranean formation 102 from a derrick 108 arranged at the surface 110. The derrick 108 can include a kelly 112 used to lower and raise the drill-string 106.

The BHA 104 may include a drill bit 114 operatively coupled to a tool string 116, which may be moved axially within a drilled wellbore 118 and can be attached to the drill-string 106. The tool string 116 may include one or more wellbore tools 109 for determining conditions in the wellbore 118 or for performing other suitable wellbore operations. During operation, the drill bit 114 can penetrate the subterranean formation 102 to create the wellbore 118. The BHA 104 can control the drill bit 114 as the drill bit 114 advances into the subterranean formation 102. Fluid or "mud" from a mud tank 120 may be pumped downhole using a mud pump 122 that can be powered by an adjacent power source, such as a prime mover or motor 124. The mud may be pumped from the mud tank 120, through a stand pipe 126, which can feed the mud into the drill-string 106 and can convey the mud to the drill bit 114. The mud can exit one or more nozzles (not shown) arranged in the drill bit 114 and can thereby cool the drill bit 114. After exiting the drill bit 114, the mud can circulate back to the surface 110 via the annulus defined between the wellbore 118 and the drill-string 106. Cuttings and mud mixture that can be passed through a flow line 128 can be processed such that a cleaned mud is returned down hole through the stand pipe 126.

In some examples, one or more pre-cementing operations can be performed with respect to the wellbore 118. Some mud or other fluid (e.g., hydrocarbons, water, etc.) in the wellbore 118 may be lost (e.g., lost circulation) to the subterranean formation 102. The fluid can be lost via perforations, which can be natural or artificial (e.g., formed via drilling or stimulation), in the wellbore 118. A pre-cementing operation, such as a lost circulation operation, can be performed to reduce or eliminate the lost circulation. Additionally, subsequent to a drilling operation to form the wellbore 118, the wellbore 118 may be treated or otherwise prepared. For example, the wellbore 118 can be cleaned to prepare for a cementing operation. Other suitable pre-cementing operations can be performed.

A treatment fluid, a mixture, a solution, or other suitable material can be prepared and can be positioned in the wellbore 118 for performing the one or more pre-cementing operations. For example, the treatment fluid can be positioned in the wellbore 118 for plugging (e.g., at least temporarily) perforations in the wellbore 118 that may cause lost circulation. The treatment fluid may temporarily plug the perforations for allowing the cementing operation to be performed. Additionally, the treatment fluid can be a spacer fluid that can be positioned in the wellbore 118 for cleaning (e.g., abrasively removing mud) the wellbore 118. The treatment fluid can include a crushed glass material (or other suitable supplementary cementitious material) that can be dispersed in a base fluid of the treatment fluid. Particles of the crushed glass material can include a measure of hardness and angularity that can allow the treatment fluid to function as the spacer fluid for cleaning mud or other fluid or debris from the wellbore 118 for improving cement adhesion of a cementing operation.

The crushed glass material can include a predetermined range of particle sizes that may plug perforations in the wellbore 118 or otherwise reduce or eliminate lost circulation in the wellbore 118. Additionally or alternatively, the crushed glass material can include an engineered treatment fluid of particle size ranges. For example, the crushed glass material may be available in a first size range, a second size range, and a third size range. In a first example, the engineered treatment fluid can include particles of crushed glass material from the first size range, the second size range, and the third size range. In a second example, the crushed glass material can include particles from just the second size range. Other suitable examples and suitable combinations are possible. The predetermined range of particles sizes, the engineered treatment fluid of particle size ranges, or a combination thereof for the crushed glass material may be selected or otherwise determined based at least on wellbore parameters (e.g., perforation size, lost circulation rate, or other suitable parameters) or other suitable factors.

The treatment fluid can be prepared at the surface 110, for example, in a mixing device 130. The mixing device 130 can allow the treatment fluid to be prepared (e.g., via on-the-fly mixing in which the treatment fluid can be positioned in the wellbore 118 while being mixed or otherwise prepared) to a predetermined density before positioning the treatment fluid in the wellbore 118. Alternatively, the treatment fluid can be prepared offsite (e.g., via batch mixing and based on a predetermined particle size-range) and can be received, pre-mixed, at the well system 100 to be positioned in the wellbore 118. In some examples, components of the treatment fluid can be positioned in the wellbore 118 and mixed while in the wellbore 118 for performing the pre-cementing operation.

In some examples, the well system 100 can include a computing device 140 that can be positioned belowground, aboveground, onsite, in a vehicle, offsite, etc. As illustrated with respect to FIG. 1, the computing device 140 is positioned at the surface 110 but can be positioned in any other suitable location. The computing device 140 can include a processor interfaced with other hardware via a bus. A memory, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 140. In some examples, the computing device 140 can include input/output interface components (e.g., a display, printer, keyboard, touch-sensitive surface, and mouse) and additional storage. The computing device 140 can be communicatively coupled to any suitable component of the well system 100 (e.g., via a wireless connection or a wired connection).

The computing device 140 can include a communication device 144. The communication device 144 can represent one or more of any components that facilitate a network connection. In the example illustrated in FIG. 1, the communication device 144 is wireless and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device 144 can use acoustic waves, surface waves, vibrations, optical waves, or induction (e.g., magnetic induction) for engaging in wireless communications. In other examples, the communication device 144 can be wired and can include interfaces such as Ethernet, USB, IEEE 1394, or a fiber optic interface. In an example with at least one other computing device, the computing device 140 can receive wired or wireless communications from the other computing device and perform one or more tasks based on the communications and with respect to the well system 100. For example, the computing device 140 (or a non-transitory computer-readable medium included in the memory of the computing device 140, etc.) can perform the operations, or a subset thereof, described with respect to techniques disclosed herein (e.g., determining optimal particle size-ranges of the crushed glass material, etc.).

Figure 2:
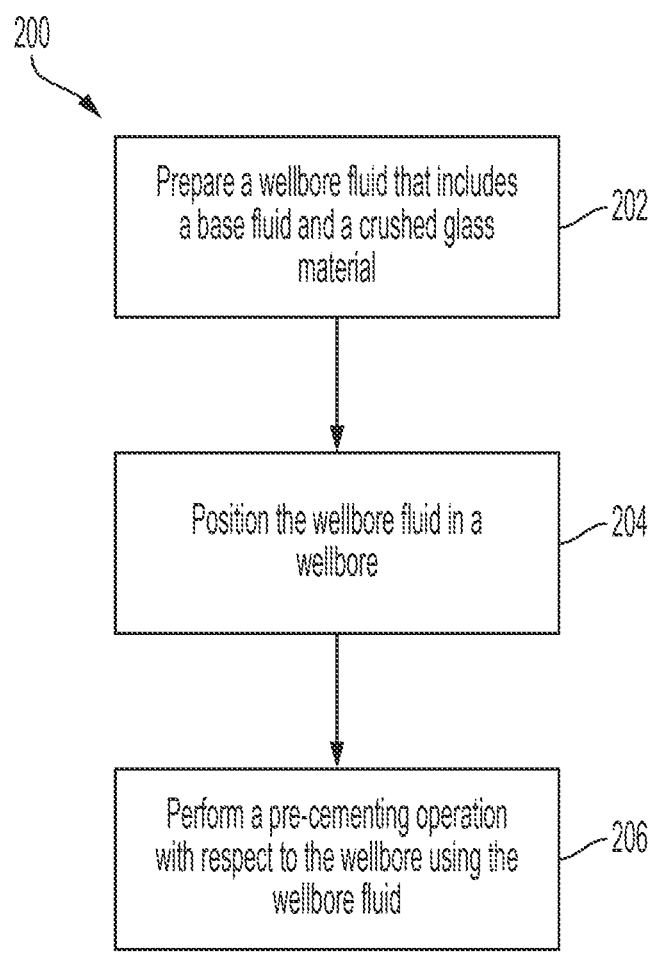
FIG. 2 is a flowchart of a process to perform a pre-cementing operation with respect to a wellbore using a treatment fluid according to one example of the present disclosure.

FIG. 2 is a flowchart of a process 200 to perform a pre-cementing operation with respect to a wellbore 118 using a treatment fluid according to one example of the present disclosure. At block 202, a wellbore fluid is prepared. The wellbore fluid (e.g., a treatment fluid, a solution, etc.) can include a base fluid and crushed glass material dispersed in the base fluid. In some examples, the crushed glass material can be or otherwise include recycled glass material (e.g., post-consumer recycled glass). The wellbore fluid can additionally include one or more viscosifiers (e.g., biopolymer viscosifiers) for controlling a density of the wellbore fluid, one or more surfactants for increasing wettability of the wellbore fluid, other suitable components, or a combination thereof. The viscosifiers, the surfactants, and the other suitable components can be dispersed in the base fluid of the wellbore fluid. The wellbore fluid can be batch mixed (e.g., using a predetermined particle size-range of the crushed glass material), which can be performed at the well system 100 or offsite. Alternatively, the wellbore fluid can be mixed on-the-fly (e.g., using the mixing device 130), which can be performed at the well system 100, by metering the base fluid into the mixing device 130 until a desired density is reached. In some examples, mixing the treatment fluid on-the-fly can involve mixing the treatment fluid while positioning the treatment fluid in the wellbore 118. Other suitable techniques can be used to form the wellbore fluid having the crushed glass material.

The crushed glass material can include various types or variations of glass material. For example, the crushed glass material can include boro-silicate glass, soda-lime glass, glass with pigment additives, or other suitable types of glass material. Viscosifiers and other additives (e.g., surfactants) to the wellbore fluid can be tested with the crushed glass material to verify no adverse reactions occur by using the wellbore fluid in the presence of drilling mud, slurry, or other compositions in the wellbore 118.

At block 204, the wellbore fluid is positioned in a wellbore 118. The wellbore fluid can be pumped downhole subsequent to forming (e.g., batch-mixing, on-the-fly mixing, etc.) the wellbore fluid. In some examples, the wellbore fluid can be mixed or otherwise formed subsequent to, or while, being pumped downhole in the wellbore 118.

At block 206, a pre-cementing operation is performed in the wellbore 118 using the wellbore fluid. The pre-cementing operation can be performed prior to, or in preparation of, a cementing operation with respect to the wellbore 118. For example, the pre-cementing operation can include a wellbore cleaning operation that can clean a wall or other suitable component of the wellbore 118. The crushed glass material of the wellbore fluid can abrasively clean the wellbore 118 to remove mud or other debris that may impact cement adhesion. By cleaning the wellbore 118 with the treatment fluid having the crushed glass material, subsequent cementing operations may experience improved cement adhesion in the wellbore 118 compared to cement adhesion of cementing operations performed without wellbore cleaning or performed subsequent to a wellbore cleaning with a solution not having the crushed glass material.

In another example, the pre-cementing operation can include a lost circulation operation in which the wellbore fluid can be positioned in the wellbore 118 for reducing or eliminating lost circulation in the wellbore 118. Subsequent to drilling, perforations in the wellbore 118 can cause a loss in fluid (mud, produced hydrocarbon, etc.). The perforations can include different sizes (nano-scale size, micro-scale size, etc.). The crushed glass material of the wellbore fluid can include particles of a pre-defined size-range. For example, the pre-defined size-range can be selected based on the size-range of the perforations in the wellbore. Alternatively, the pre-defined size-range can otherwise be selected to optimize a reduction in fluid loss in the wellbore. Once positioned in the wellbore 118, the crushed glass material of the wellbore fluid may, at least temporarily, plug the perforations or otherwise reduce or eliminate fluid loss in the wellbore 118. In some examples, the lost circulation operation may be performed to reduce or eliminate lost circulation prior to the cementing operation.

Figure 3:
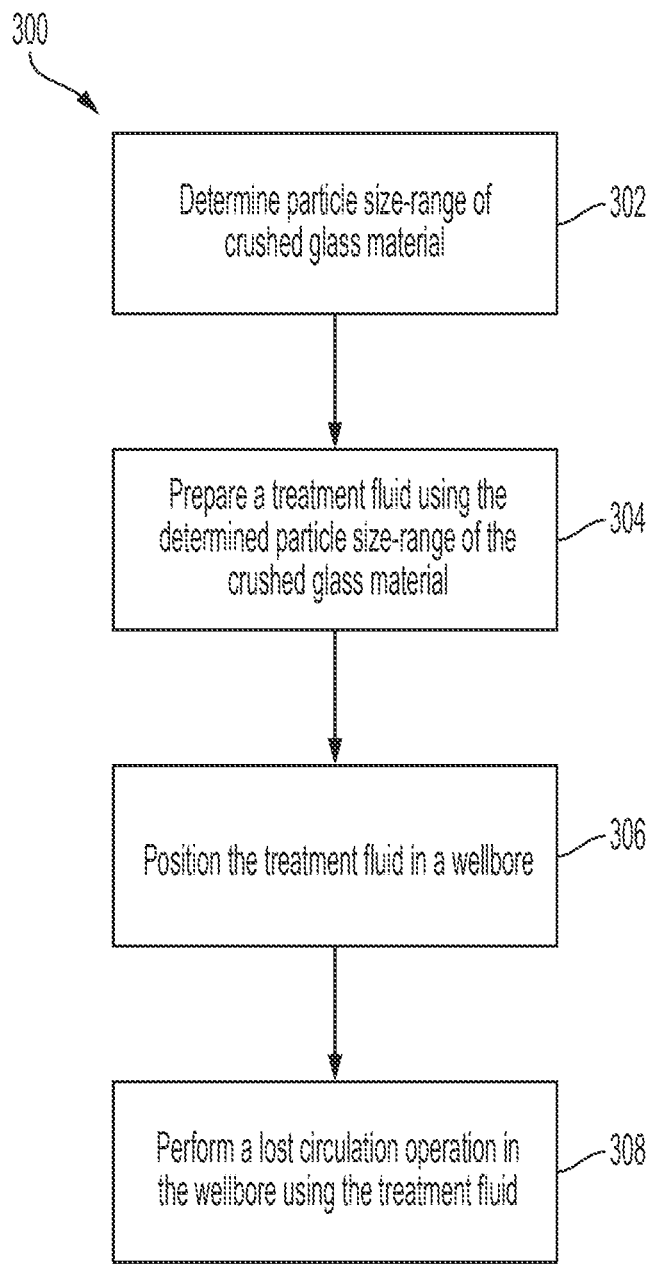
FIG. 3 is a flowchart of a process to prepare and use a treatment fluid for a lost circulation operation with respect to a wellbore according to one example of the present disclosure.

FIG. 3 is a flowchart of a process 300 to prepare and use a treatment fluid for a lost circulation operation with respect to a wellbore 118 according to one example of the present disclosure. At block 302, one or more particle size-ranges are determined for a crushed glass material. The crushed glass material may include various particle size-ranges. For example, the particle size-range can include 68 microns (0.002 in) to 310 microns (0.012 in), 500 microns (0.020 in) to 1820 microns (0.072 in), or other suitable particle size-ranges. The particle size-range can be determined based on a known size-range of perforations in a wellbore 118. For example, if the size-range of the perforations of the wellbore 118 is 125 microns (0.005 in) to 250 microns (0.010 in), the particle size-range of the crushed glass material may be chosen to be 68 microns (0.002 in) to 310 microns (0.012 in).

In some examples, the size-range of the perforations of the wellbore 118 may not be well-defined or otherwise known. In these examples, the particle size-range of the crushed glass material can be determined to optimize (e.g., minimize) lost circulation in the wellbore 118. For example, a widest range of particles can be selected for the crushed glass. Other suitable techniques for determining the particle size-ranges of the crushed glass material can be used.

At block 304, a treatment fluid (or solution, etc.) is prepared based on the determined particle size-range of the crushed glass material. The treatment fluid can include a base fluid, one or more viscosifiers for adjusting density of the treatment fluid, one or more surfactants, the crushed glass material having the determined particle size-range, or other suitable components for the treatment fluid. The treatment fluid can be batch-mixed in which the treatment fluid can be prepared prior to pumping the treatment fluid into the wellbore 118. In some examples, the treatment fluid can be prepared prior to being received at the well system 100. In other examples, the treatment fluid can be batch-mixed at the well system 100 prior to being used. Batch-mixing the treatment fluid for use in the lost circulation operation may allow an optimal particle size-range of crushed glass material particles to be selected to provide an optimal reduction, or elimination, of lost circulation in the wellbore 118. Other techniques for preparing the treatment fluid can be used.

At block 306, the treatment fluid is positioned in a wellbore 118. Subsequent to preparing the treatment fluid, the treatment fluid can be positioned in the wellbore 118. The treatment fluid can be pumped downhole or can be positioned downhole in the wellbore 118 using other suitable techniques.

At block 308, a lost circulation operation is performed in the wellbore 118 using the treatment fluid. In response to positioning the treatment fluid in the wellbore 118, the lost circulation operation can be performed for limiting or eliminating loss of fluid in the wellbore 118. The crushed glass material of the treatment fluid can include a particle size-range that can, at least temporarily, plug perforations (e.g., for performing lost circulation in the wellbore 118) in the wellbore 118. The treatment fluid can use the crushed glass material to reduce or eliminate lost circulation (or other loss of fluids) in the wellbore 118 prior to a cementing operation or for other purposes. For example, the treatment fluid can be positioned in the wellbore 118 to reduce or eliminate loss of mud or produced hydrocarbon fluid through perforations (or other suitable loss channels, etc.) in the wellbore 118.

In some examples, pre-fabricated "pills" can be used to perform the lost circulation pre-cementing operation in the wellbore 118. A pill can include a base fluid, a crushed glass material, and other suitable components (viscosifiers, surfactants, etc.). The pill can be batch-mixed to a predetermined volume prior to being used. The pill can be positioned in the wellbore 118 to plug pores or perforations (e.g., vugs, channels, etc.) in the wellbore 118 that may be causing lost circulation. The pill may be used individually or in conjunction with other pills (e.g., cementitious pills having fluid-loss additives).

Figure 4:
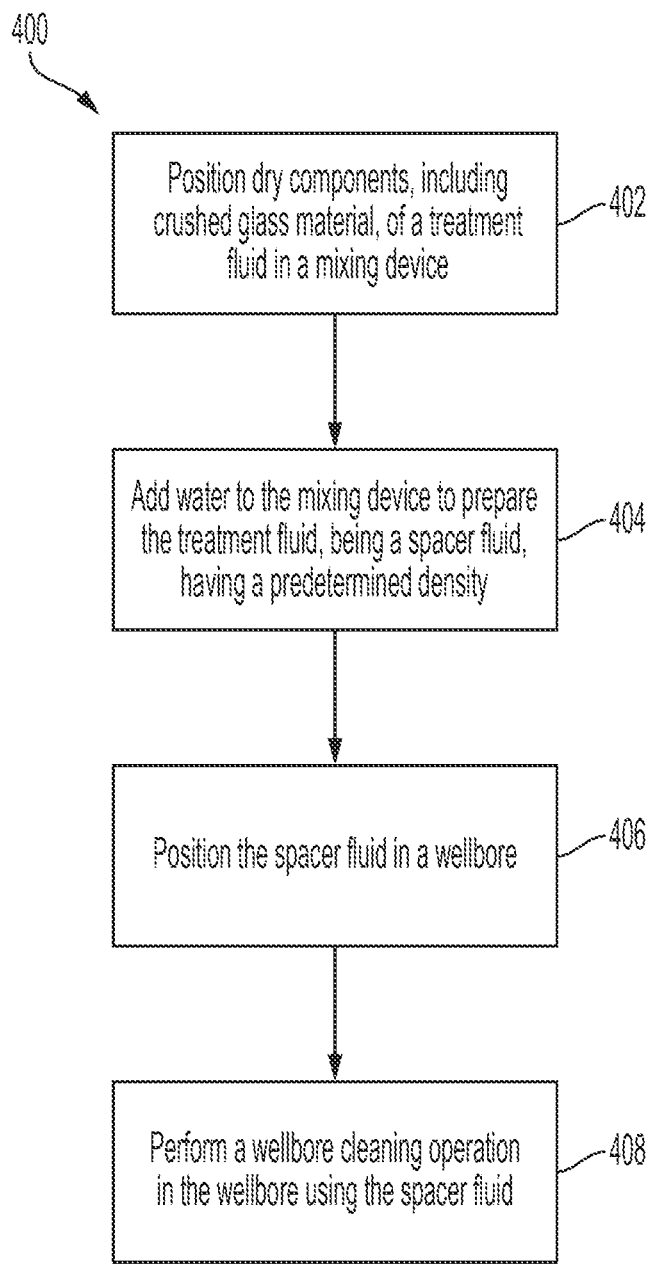
FIG. 4 is a flowchart of a process to prepare and use a treatment fluid for a wellbore cleaning operation prior to a cementing operation with respect to a wellbore according to one example of the present disclosure.

FIG. 4 is a flowchart of a process 400 to prepare and use a treatment fluid for a wellbore cleaning operation prior to a cementing operation with respect to a wellbore 118 according to one example of the present disclosure. At block 402, dry components of a treatment fluid (or a solution, etc.) are positioned in a mixing device 130. The dry components of the treatment fluid can include a crushed glass material, one or more viscosifiers (e.g., a biopolymer viscosifier), one or more surfactants (e.g., for increasing a wetting performance of the treatment fluid), other suitable dry components, or a combination thereof. The mixing device 130 can include any suitable mixing device that can mix (e.g., physically or otherwise) dry or wet components to form the treatment fluid.

At block 404, water (or other suitable base fluid) is added to the mixing device 130 to prepare the treatment fluid. In some examples, the treatment fluid can be or otherwise include a spacer fluid, which can be used to clean a wellbore. The mixing device 130 can physically mix (e.g., by rotation, vibration, other forms of agitation, etc.) the dry components and the base fluid to prepare the treatment fluid as a spacer fluid. An amount of the base fluid metered into the mixing device 130 can depend on a desired density of the spacer fluid. For example, the base fluid can be controllably added to the mixing device 130 until the desired density is achieved.

At block 406, the wellbore fluid is positioned in the wellbore. Subsequent to preparing the treatment fluid, the treatment fluid can be positioned in the wellbore 118. The treatment fluid can be pumped downhole or can be positioned downhole in the wellbore 118 using other suitable techniques. In some examples, the treatment fluid can be positioned in the wellbore 118 while the treatment fluid is being mixed, before the treatment fluid is fully mixed, etc., from the mixing device 130.

At block 408, a wellbore cleaning operation is performed using the treatment fluid. The treatment fluid, being a spacer fluid, can be used to clean abrasively a wall or other suitable component of the wellbore 118. For example, the crushed glass material of the treatment fluid can remove mud or other suitable debris from the wall or other suitable component of the wellbore 118 via mechanical abrasion. The crushed glass material may include a hardness and an angularity that can allow the treatment fluid to function as a spacer fluid and to clean abrasively in the wellbore 118. For example, the hardness of particles of the crushed glass material can be between six MOHs and seven MOHs or other suitable hardness measures for cleaning the wellbore 118 abrasively. Additionally, the particles can include a measure of angularity (e.g., acuteness, corner measures, amount of angles, etc.) that can allow the particles to function as a spacer fluid (e.g., remove mud or other debris from the wellbore 118). The wellbore cleaning operation can be performed prior to a cementing operation, and can allow adequate adhesion of the cement to the wellbore 118.

Figure 5:
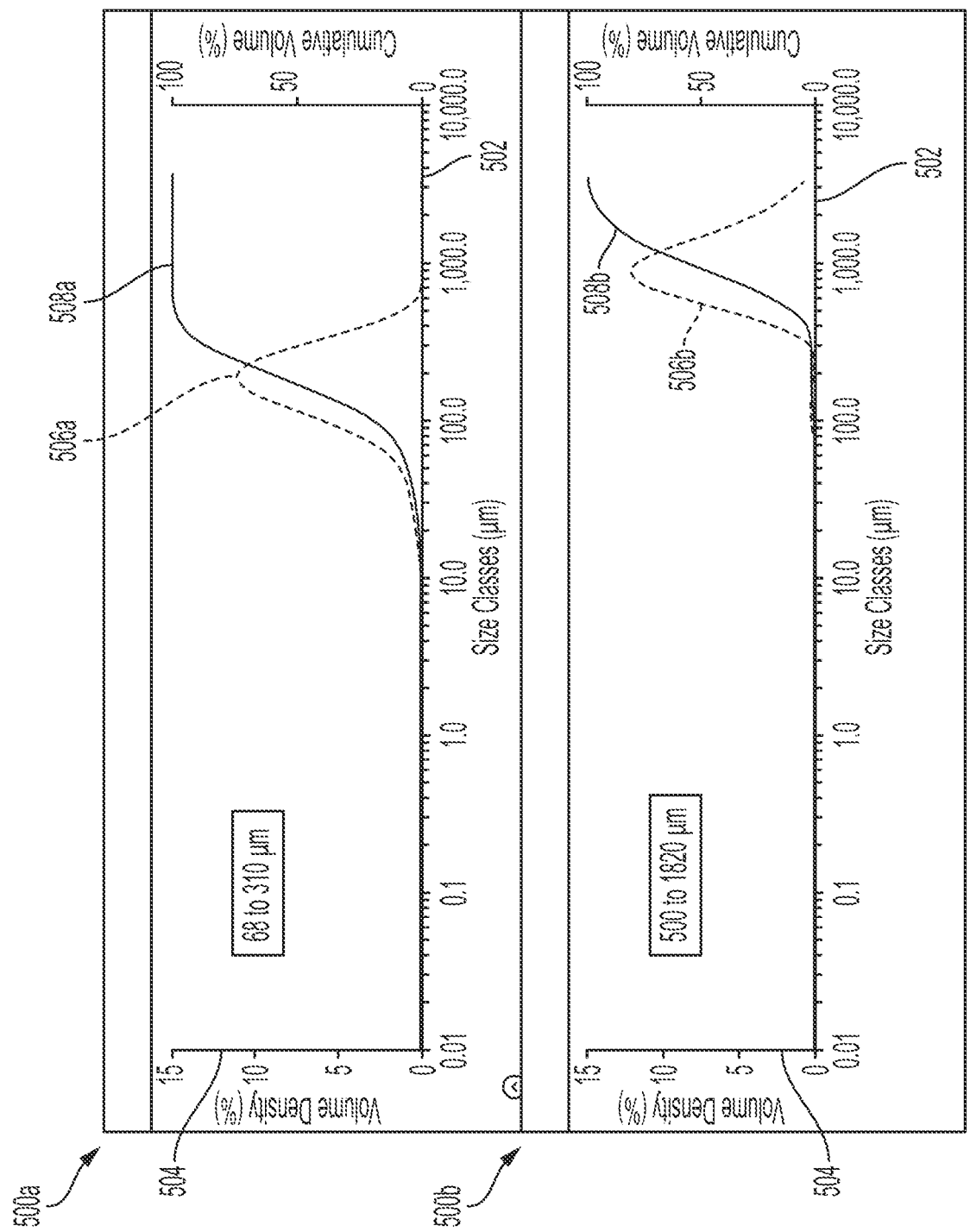
FIG. 5 is a set of plots of size distribution of a crushed glass material according to one example of the present disclosure.

FIG. 5 is a set of plots 500a-b of size distribution of a crushed glass material according to one example of the present disclosure. The crushed glass material may include recycled glass material (e.g., post-consumer recycled glass). The plots 500a-b may each include a horizontal axis 502, representing size of a single particle, and a vertical axis 504, representing a volume density or cumulative density. The plot 500a may represent a plot of particle size distribution for crushed glass material ranging from 68 microns (0.002 in) to 310 microns (0.012 in), and the plot 500b may represent a plot of particle size distribution for crushed glass material ranging from 500 microns (0.020 in) to 1820 microns (0.072 in).

The plots 500a-b can include first curves 506a-b and second curves 508a-b, respectively. The first curves 506a-b are illustrated in FIG. 5 as bell curves and may represent a percentage of each particle size in the set of particles of the respective particle size-range. The second curves 508a-b may be read from left-to-right and may represent a cumulative percentage (e.g., the very left of the curve is zero, the very right is 100%, and the curves 508a-b increase based on an amount of each particle at each possible particle size) of the particles of the respective particle size-range.

Figure 6:
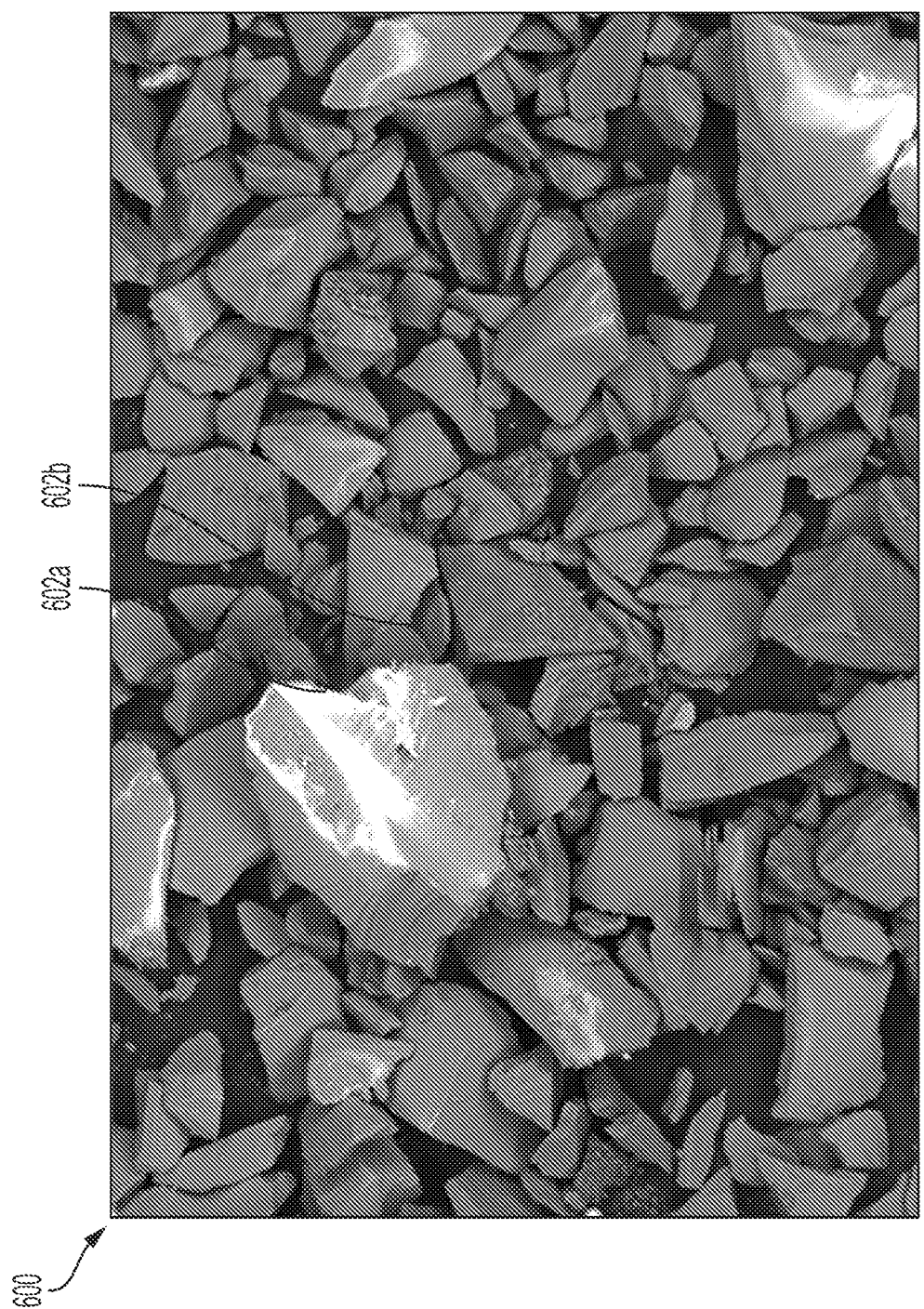
FIG. 6 is an image of a set of particles of a crushed glass material according to one example of the present disclosure.

FIG. 6 is an image 600 of a set of particles of a crushed glass material according to one example of the present disclosure. The image 600 can be generated using scanning electron microscopy, atomic force microscopy, or other suitable imaging techniques. The illustrated set of particles may range from 68 microns (0.002 in) to 310 (0.012 in) (e.g., similar to the plot 500a). The set of particles may include a hardness and an angularity that is larger than (or otherwise improved over) particles of other scouring agents. For example, particles 602a-b may include an illustrated angularity that may allow a treatment fluid having the crushed glass material to clean the wellbore 118 abrasively. Additionally, the hardness may be from six MOHs to seven MOHs or other suitable measures of hardness.

In some aspects, methods and treatment fluids for performing a pre-cementing operation with respect to a wellbore are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a method comprising: preparing a wellbore fluid, the wellbore fluid including a base fluid and a crushed glass material; positioning the wellbore fluid in a wellbore; and performing a pre-cementing operation with respect to the wellbore using the wellbore fluid.

Example 2 is the method of example 1, wherein the crushed glass material comprises recycled glass material, wherein the base fluid comprises water, and wherein the wellbore fluid further comprises a viscosifier.

Example 3 is the method of example 1, wherein the crushed glass material includes particles within a predetermined size-range, and wherein the particles include a hardness and an angularity that allow the wellbore to function as a spacer fluid.

Example 4 is the method of any of examples 1 and 3, wherein performing the pre-cementing operation includes performing a lost circulation operation in the wellbore using the particles of the crushed glass material within the predetermined size-range.

Example 5 is the method of any of examples 1 and 3-4, wherein positioning the wellbore fluid in the wellbore includes batch-mixing the crushed glass material with the base fluid prior to positioning the wellbore fluid in the wellbore.

Example 6 is the method of any of examples 1 and 3, wherein performing the pre-cementing operation includes performing a wellbore cleaning operation in which the wellbore fluid is a spacer fluid to abrasively clean the wellbore prior to a cementing operation.

Example 7 is the method of any of examples 1, 3, and 6, wherein positioning the wellbore fluid in the wellbore includes mixing the crushed glass material with the base fluid while positioning the wellbore fluid in the wellbore.

Example 8 is a treatment fluid comprising: a base fluid; a viscosifier dispersed in the base fluid; and a crushed glass material dispersed in the base fluid for performing a pre-cementing operation in a wellbore.

Example 9 is the treatment fluid of example 8, wherein the crushed glass material comprises recycled glass material, the base fluid comprises water, and the viscosifier comprises at least one biopolymer viscosifier.

Example 10 is the treatment fluid of example 8, wherein the crushed glass material includes particles within a predetermined size-range, and wherein the particles include a hardness and an angularity that allow the treatment fluid to function as a spacer fluid.

Example 11 is the treatment fluid of any of examples 8 and 10, wherein the pre-cementing operation in the wellbore includes a lost circulation wellbore operation, and wherein the particles of the crushed glass material within the predetermined size-range are usable to perform the lost circulation wellbore operation.

Example 12 is the treatment fluid of any of examples 8 and 10-11, wherein the treatment fluid is positionable in the wellbore subsequent to being batch-mixed using the crushed glass material, the base fluid, and the viscosifier.

Example 13 is the treatment fluid of any of examples 8 and 10, wherein the pre-cementing operation in the wellbore includes a wellbore cleaning operation in which the treatment fluid is usable as a spacer to clean the wellbore prior to performing a cementing operation in the wellbore.

Example 14 is the treatment fluid of any of examples 8, 10, and 13, wherein the treatment fluid is positionable in the wellbore while the crushed glass material is being mixed with the base fluid and the viscosifier.

Example 15 is a treatment fluid comprising: a wellbore fluid; and a crushed glass material dispersed in the wellbore fluid for performing a pre-cementing operation in a wellbore.

Example 16 is the treatment fluid of example 15, wherein the crushed glass material comprises recycled glass material and the wellbore fluid comprises water and one or more biopolymer viscosifiers.

Example 17 is the treatment fluid of example 15, wherein the crushed glass material includes particles within a predetermined size-range, and wherein the particles include a hardness and an angularity that allow the treatment fluid to function as a spacer fluid.

Example 18 is the treatment fluid of any of examples 15 and 17, wherein the pre-cementing operation in the wellbore includes a lost circulation wellbore operation, and wherein the particles of the crushed glass material within the predetermined size-range are usable to perform the lost circulation wellbore operation.

Example 19 is the treatment fluid of any of examples 15 and 17-18, wherein the treatment fluid is positionable in the wellbore subsequent to the crushed glass material being batch-mixed with the wellbore fluid.

Example 20 is the treatment fluid of any of examples 15 and 17, wherein the pre-cementing operation in the wellbore includes a wellbore cleaning operation in which the treatment fluid is usable as a spacer to clean the wellbore prior to performing a cementing operation in the wellbore, and wherein the treatment fluid is positionable in the wellbore while the crushed glass material is being mixed with the wellbore fluid.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A treatment fluid comprising:
   a base fluid;
   a biopolymer viscosifier dispersed in the base fluid;
   an alkali activator dispersed in the base fluid; and
   a crushed, synthetic, recycled glass material dispersed in the base fluid for performing a pre-cementing operation in a wellbore, wherein the crushed, synthetic, recycled glass material comprises soda-lime glass particles, wherein the pre-cementing operation comprises a lost circulation operation, wherein the crushed, synthetic, recycled glass material includes a plurality of particles, wherein a first subset of the plurality of particles has a first predetermined size range and a second subset of the plurality of particles has a second predetermined size range that is different than the first predetermined size range, wherein the alkali activator comprises material to hydrate over time to form a plugging matrix, and wherein the first subset and the second subset include particles that are combinable to form a scouring agent.

2. The treatment fluid of claim 1, wherein the particles included in the first subset and the second subset have a hardness and angularity to form the scouring agent in the wellbore.

3. The treatment fluid of claim 1, wherein the treatment fluid is positionable in the wellbore subsequent to being batch-mixed using the crushed, synthetic, recycled glass material, the base fluid, and the biopolymer viscosifier.

4. The treatment fluid of claim 3, wherein the pre-cementing operation in the wellbore includes a wellbore cleaning operation in which the treatment fluid is usable as a spacer to clean the wellbore prior to performing a cementing operation in the wellbore.

5. The treatment fluid of claim 3, wherein the treatment fluid is positionable in the wellbore while the crushed, synthetic, recycled glass material is being mixed with the base fluid and the biopolymer viscosifier.

6. The treatment fluid of claim 1, wherein the biopolymer viscosifier includes at least one of diutan gum or welan gum.

7. A treatment fluid comprising:
a wellbore fluid comprising a biopolymer viscosifier;
an alkali activator dispersed in the wellbore fluid; and
a crushed, synthetic, recycled glass material dispersed in the wellbore fluid for performing a pre-cementing operation in a wellbore, wherein the crushed, synthetic, recycled glass material comprises soda-lime glass particles, wherein the pre-cementing operation comprises a lost circulation operation, wherein the crushed, synthetic, recycled glass material includes a plurality of particles, wherein a first subset of the plurality of particles has a first predetermined size range and a second subset of the plurality of particles has a second predetermined size range that is different than the first predetermined size range, wherein the alkali activator comprises material to hydrate over time to form a plugging matrix, and wherein the first subset and the second subset include particles that are combinable to form a scouring agent.

8. The treatment fluid of claim 7, wherein the particles included in the first subset and the second subset have a hardness and angularity to form the scouring agent in the wellbore.

9. The treatment fluid of claim 8, wherein the plurality of particles of the crushed, synthetic, recycled glass material is usable to perform the lost circulation operation, and wherein the treatment fluid is positionable in the wellbore subsequent to the crushed, synthetic, recycled glass material being batch-mixed with the wellbore fluid.

10. The treatment fluid of claim 7, wherein the pre-cementing operation in the wellbore includes a wellbore cleaning operation in which the treatment fluid is usable as a spacer to clean the wellbore prior to performing a cementing operation in the wellbore, and wherein the treatment fluid is positionable in the wellbore while the crushed, synthetic, recycled glass material is being mixed with the wellbore fluid.

11. The treatment fluid of claim 7, wherein the plugging matrix is retainable in one or more lost circulation zones of the wellbore.

12. The treatment fluid of claim 7, wherein the biopolymer viscosifier includes at least one of diutan gum or welan gum.

13. A treatment fluid comprising:
a base fluid;
a biopolymer viscosifier dispersed in the base fluid;
an alkali activator dispersed in the base fluid, the alkali activator activatable to form a plugging matrix; and
a crushed, synthetic, recycled glass material dispersed in the base fluid for performing a pre-cementing operation in a wellbore, wherein the plugging matrix is retainable in one or more lost circulation zones of the wellbore during a pre-cementing operation that comprises a lost circulation operation, wherein the crushed, synthetic, recycled glass material includes a plurality of particles, wherein a first subset of the plurality of particles has a first predetermined size range and a second subset of the plurality of particles has a second predetermined size range that is different than the first predetermined size range, wherein the alkali activator comprises material to hydrate over time to form a plugging matrix, and wherein the first subset and the second subset include particles that are combinable to form a scouring agent.

14. The treatment fluid of claim 13, wherein the crushed, synthetic, recycled glass material comprises soda-lime glass particles.

15. The treatment fluid of claim 13, wherein the particles included in the first subset and the second subset have a hardness and angularity to form the scouring agent in the wellbore.

16. The treatment fluid of claim 15, wherein the plurality of particles of the crushed, synthetic, recycled glass material is usable to perform the lost circulation operation, and wherein the treatment fluid is positionable in the wellbore subsequent to the crushed, synthetic, recycled glass material being batch-mixed with the base fluid.

17. The treatment fluid of claim 13, wherein the pre-cementing operation in the wellbore includes a wellbore cleaning operation in which the treatment fluid is usable as a spacer to clean the wellbore prior to performing a cementing operation in the wellbore, and wherein the treatment fluid is positionable in the wellbore while the crushed, synthetic, recycled glass material is being mixed with the base fluid.

18. The treatment fluid of claim 13, wherein the biopolymer viscosifier includes at least one of diutan gum or welan gum.

* * * * *